Sept. 9, 1952          A. J. CARVER          2,609,556
FLUID PROPELLED PIPE SCRAPER
Filed Dec. 29, 1945          2 SHEETS—SHEET 2
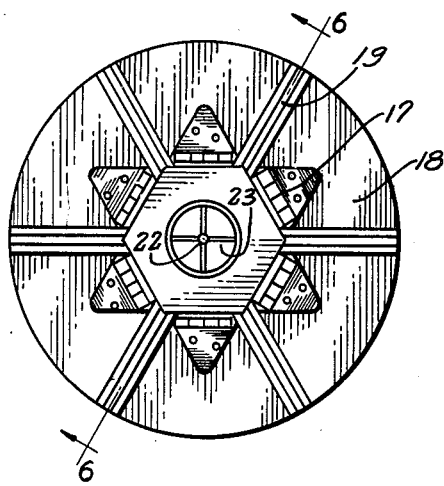
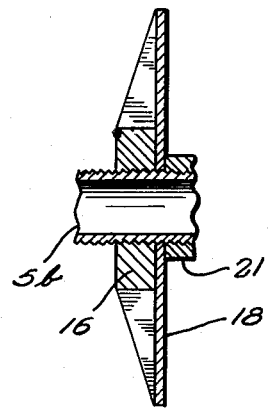
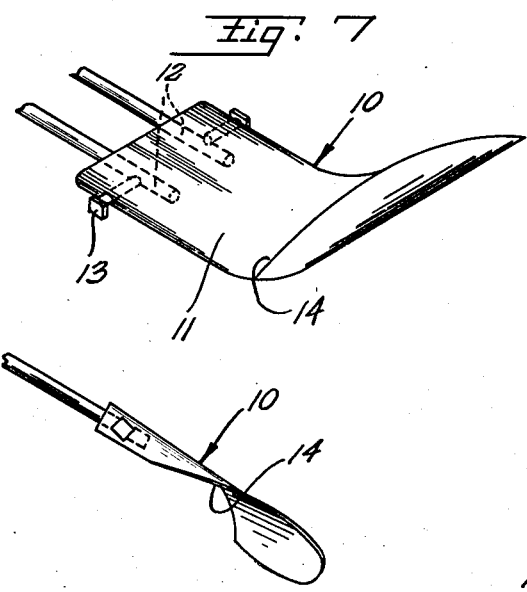
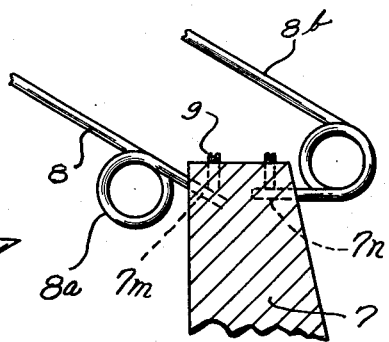
Inventor
ANDREW J. CARVER
By Clarence A. O'Brien
and Harvey B. Jacobson
Attorneys Patented Sept. 9, 1952

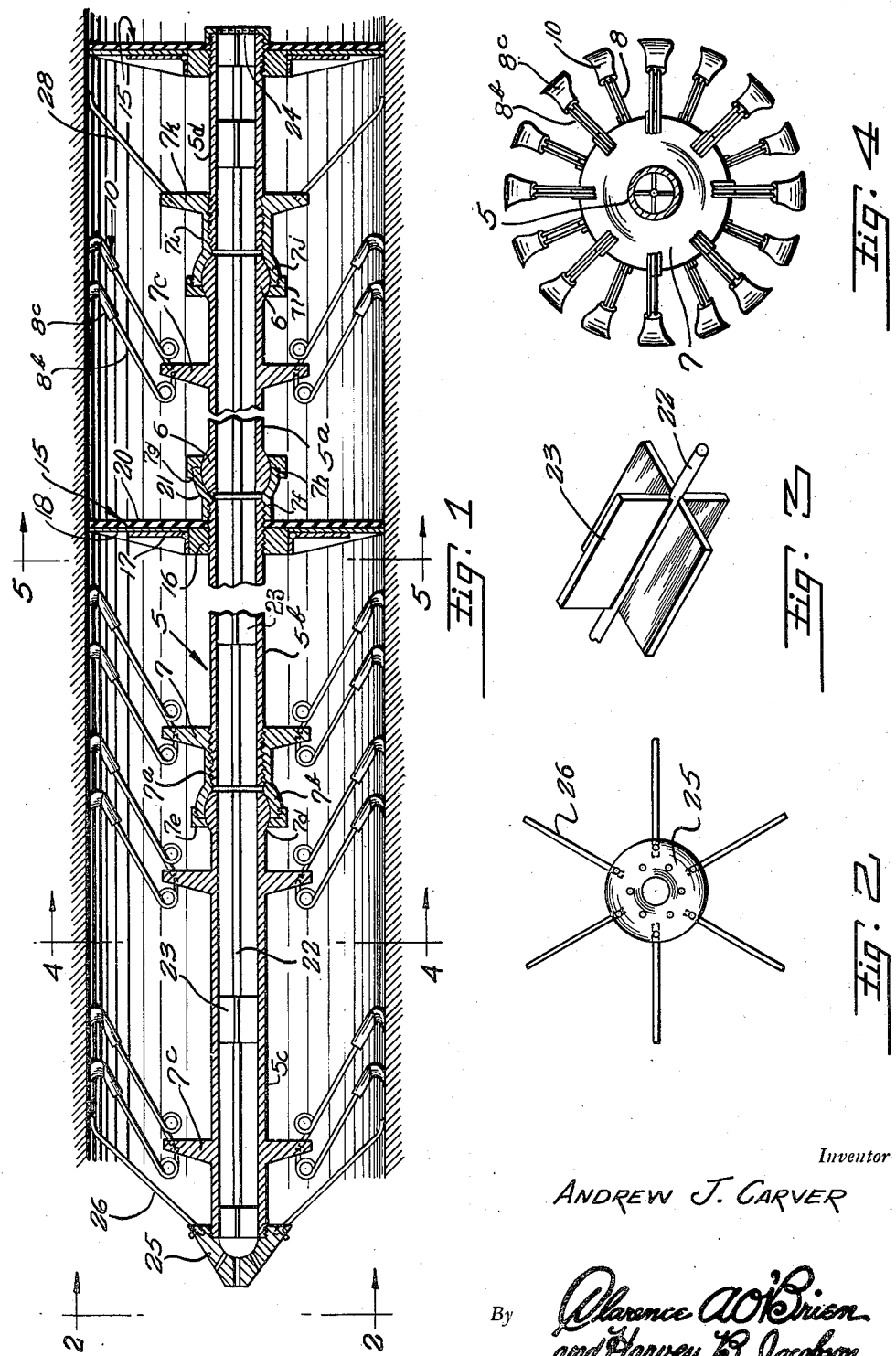

2,609,556

UNITED STATES PATENT OFFICE 2,609,556

FLUID PROPELLED PIPE SCRAPER

Andrew J. Carver, Walters, Okla.

Application December 29, 1945, Serial No. 638,340

1 Claim. (Cl. 15—104.06)

The present invention relates to a new and useful improvement in pipe cleaning apparatus, and more particularly to a pipe cleaner of a hydraulically operated type.

An important object of the present invention is to provide a pipe cleaner adapted to operate in curved as well as straight pipes.

Another object of the invention is to provide a pipe cleaner which will effectively clean pipes in substantially an automatic manner.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a longitudinal sectional view through the cleaning apparatus.

Figure 2 is a front elevational view thereof.

Figure 3 is a perspective view of one of the spacer fins in the conduit.

Figure 4 is a transverse sectional view taken substantially on a line 4—4 of Figure 1.

Figure 5 is a transverse sectional view showing one of the pushers and taken substantially on a line 5—5 of Figure 1.

Figure 6 is a transverse sectional view taken on a line 6—6 of Figure 5.

Figure 7 is a perspective view of one of the scraper elements.

Figure 8 is an edge elevational view thereof.

Figure 9 is an enlarged fragmentary sectional view of the outer periphery of one of the cups showing the resilient stems for the scraper tools secured thereto.

Referring now to the drawings in detail wherein for the purpose of illustration, there is disclosed a preferred embodiment of the present invention, the numeral 5 designates an elongated open ended conduit or tubular member composed of intermediate tubular sections 5a and 5b, and end tubular sections 5a and 5d.

The ends of section 5a are formed with balls 6 while the ends of section 5b are externally threaded. The end of section 5c adjacent one end of section 5b is formed with a ball 7d. A sleeve 7a is threaded on the end of section 5b adjacent ball 7d and has one end formed with a socket 7b that receives ball 7d. A retaining collar 7e embraces the ball 7d and is threaded on the socket 7b to retain ball 7d within socket 7b. The other end of sleeve 7a is formed with a flange or hub 7.

An internally threaded sleeve 7f is threaded on the other end of section 5b and is formed at one end with a socket 7g that receives a ball 6 of section 5a. A retainer collar or ring 7h is threaded about the socket 7g and engages the ball 6 received in the socket 7g to retain these members engaged with one another.

Additional hubs or flanges 7c are formed on the sections 5a, 5b and 5c. The flanges 7 and 7c carry radially projecting scraping means later to be more fully described.

The ball 6 at the other end of section 5a is coupled to one end of section 5d through the medium of a sleeve 7i but is threaded on the section 5d and which sleeve is formed at one end with a socket 7j that swivelly receives the adjacent ball 6 or section 5b. The other end of sleeve 7i is formed with a flange 7k supporting radially projecting spring guide fingers 28. A retainer collar or ring 7l is threaded on socket 7j and engages the ball 6 received in socket 7j to hold these two elements swivelly engaged.

One face of the flanges 7 and 7c at their peripheral portions are formed with slanting bores 7m obliquely disposed to the longitudinal axis of the conduit 5, and disposed in these bores are the inner ends of stems 8 which are held in place by set screws 9. The outer ends of these stems carry scraper tools which are designated generally at 10.

The tool stems are shown in detail in Figures 7 and 8 of the drawings, each consisting of a substantially triangular-shaped plate 11 having one end formed to provide a pair of sockets 12 for receiving the corresponding ends of a pair of the stems 8, and set screws 13 are provided on the sockets 12 for retaining the tools to the stems. The outermost portions of the plate 11 are rolled to provide a channel formation 14 which contacts the inside of the pipe or other work. The stems 8 are preferably of spring rod material and are coiled adjacent their inner ends as indicated at 8a to increase the spring tension of the stem.

The other face of the flanges 7 and 7c are also formed with axially extending bores 7n in which the inner ends of additional stems 8b are secured having the scraper tools 8c thereon.

Pusher units 15 are provided and are acted upon by water in the pipe for the purpose of forcing the apparatus in cleaning action through the pipe or other work.

Each of these pusher units consists of a hub 16 of polygonal shape to the edges of which are hingedly secured plates 18 by hinges 17, the radial edge portions of which are provided with reinforcing ribs 19. Each of the segmental plates 18 forms a backing for a corresponding portion of a rubber disc 20 which has a central opening for accommodating the conduit 5.

As shown in Figure 1 of the drawings, the rubber disc 20 may be clamped between an internally threaded socket shell 21 and the corresponding hubs 16.

The ball and socket connection of the sections of the conduit permit flexing thereof and in order to normally maintain the conduits straight, a spine in the form of an elongated rod 22 of spring material is disposed longitudinally through the conduit and at certain intervals has laterally disposed spacer fins 23 which engage the inside of the conduit 5. The spine 22 extends from an apertured cap 24 at the rear end of the conduit 5 to a ported head or nozzle 25 at the forward end of the conduit. From the nozzle extend spring guide fingers 26.

In the operation of the apparatus water pressure exerted against the pusher units 15 force the apparatus through a pipe for cleaning the same. Water also passes through the conduit 5 and is sprayed from the nozzle 25 for washing the debris ahead of the cleaning apparatus. The scraping tools 10 cut against the scale and other debris lining the walls of the pipe.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described, and the scope of the appended claim.

I claim:

In a pipe cleaning apparatus, a fluid propelled pipe scraper comprising an open ended tubular member composed of a plurality of tubular sections arranged to define a conduit, whereby a fluid may pass through the entire member, said sections including first and second sections having adjacent ends, a ball at the adjacent end of the first section, external threads on the adjacent end of the second section, a sleeve threaded about said threaded end of said second section, a socket member formed at one end of the sleeve projecting beyond the adjacent end of said second section and past the adjacent end of said first section, said ball being received in said socket member, a flange at the other end of the sleeve and projecting radially outwardly from said sleeve, scraper holding means carried by said flange, means mounted on said socket member retaining the ball engaged in said socket member for universal movement, and a sealing disk mounted on said second section and having a peripheral edge for riding against the inner periphery of a pipe so as to seal all fluid flow past the scraper except through the tubular member and to provide a spray ahead of the scraper holding means, said sealing disk also providing a propelling means for the device.

ANDREW J. CARVER.

REFERENCES CITED

The following references are of record in the file of this patent:

UNITED STATES PATENTS

| Number | Name | Date |
|---|---|---|
| 137,290 | Chase | Apr. 1, 1873 |
| 302,634 | Keating | July 29, 1884 |
| 323,972 | Sweeney | Aug. 11, 1885 |
| 543,791 | Wood | July 30, 1895 |
| 928,863 | Greenan et al. | July 20, 1909 |
| 971,042 | Hill et al. | Sept. 27, 1910 |
| 1,105,528 | Nelson | July 28, 1914 |
| 1,593,072 | Haydock et al. | July 20, 1926 |
| 2,281,918 | Constant et al. | May 5, 1942 |
| 2,326,528 | Festervan et al. | Aug. 10, 1943 |
| 2,392,144 | Hall | Jan. 1, 1946 |

FOREIGN PATENTS

| Number | Country | Date |
|---|---|---|
| 198,771 | Germany | June 3, 1908 |